US006363470B1

(12) United States Patent
Laurenti et al.

(10) Patent No.: US 6,363,470 B1
(45) Date of Patent: Mar. 26, 2002

(54) CIRCULAR BUFFER MANAGEMENT

(75) Inventors: Gilbert Laurenti, Saint Paul de Vence; Karim Djafarian, Vence; Herve Catan, Saint Laurent du Var, all of (FR)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/411,187

(22) Filed: Oct. 1, 1999

(51) Int. Cl.[7] .............................................. G06F 12/00
(52) U.S. Cl. ........................ 711/220; 711/110; 710/56
(58) Field of Search ................................. 711/110, 220, 711/6; 710/52, 53, 54, 55, 56, 57

(56) References Cited

U.S. PATENT DOCUMENTS

| 4,722,067 | A | * | 1/1988 | Williams ..................... 364/746 |
| 4,742,479 | A | * | 5/1988 | Kloker et al. ................ 364/746 |
| 4,800,524 | A | * | 1/1989 | Roesgen ..................... 364/900 |
| 5,623,621 | A | * | 4/1997 | Garde ...................... 395/421.1 |
| 5,659,698 | A | * | 8/1997 | Weng et al. .............. 395/421.1 |
| 5,699,530 | A |   | 12/1997 | Rust et al. ................... 395/250 |
| 5,765,218 | A |   | 6/1998 | Ozawa et al. ............... 711/219 |
| 5,790,443 | A |   | 8/1998 | Shen et al. .................. 364/746 |
| 5,911,152 | A | * | 6/1999 | Wooten ....................... 711/208 |
| 5,983,333 | A | * | 11/1999 | Kolagotla et al. ........... 711/219 |
| 6,049,858 | A | * | 4/2000 | Kolagotla et al. ........... 711/217 |
| 6,052,766 | A | * | 4/2000 | Betker et al. ................ 711/200 |
| 6,073,228 | A | * | 6/2000 | Holmqvist et al. ......... 711/217 |
| 6,145,061 | A | * | 11/2000 | Garcia et al. ............... 711/154 |

OTHER PUBLICATIONS

Hendrix, "Implementing Circular Buffers With Bit–Reversed Addressing," Texas Instruments Application Report: SPRA292, Digital Signal Processing Solutions, pp. 1–19, Nov. 1997.*

Restle, "Circular Buffer in Second Generation DSPs", TMS320 DSP Designer's Notebook, Application Brief: SPRA203, Texas Instruments, pp 1–9, Dec. 1992.*

Horner, "Using the Circular Buffers on the TMS320C5x", TMS320 DSP Designer's Notebook, Application Brief: SPRA264, Texas Instruments, pp 1–14, Oct. 1995.*

Kloker, K.L., et al.; The Motorola DSP56000 Digital Signal Processor, IEEE Micro, vol. 6, No. 6, Dec. 1, 1986, pp. 29–48.

Fine, B., et al.; Considerations for Selecting a DSP Processor (ADSP–2101 vs. TMS320C50), Microprocessors and Microsystems, vol. 18, No. 6, Jul. 1994, pp. 351–362.

* cited by examiner

*Primary Examiner*—Matthew Kim
*Assistant Examiner*—Stephen Elmore
(74) *Attorney, Agent, or Firm*—Gerald E. Laws; W. James Brady, III; Frederick J. Telecky, Jr.

(57) ABSTRACT

Data processing apparatus 10 supporting circular buffers CB includes address storage ARx for holding a virtual buffer index and offset storage BOFxx for holding an offset address. Circular buffer management logic 802 is configured to be operable to apply a modifier to a virtual buffer index held in the address storage to derive a modified virtual buffer index and to apply a buffer offset held in the offset storage to the modified virtual buffer index to derive a physical address for addressing a circular buffer. By employing virtual addressing to a buffer index for a circular buffer management, it is possible to make efficient use of memory resources. One or more circular buffers can be located contiguously with respect to each other and/or other data in memory, avoiding fragmentation of the memory. The buffer index forms a pointer for the circular buffer. The apparatus enables circular buffers to be implemented without alignment constraints, while maintaining compatibility with prior circular buffer implementations with alignment constraints.

16 Claims, 12 Drawing Sheets

CIRCULAR BUFFER MANAGEMENT

This application claims priority to S.N. 98402464.6, filed in Europe on Oct. 6, 1998 (TI-27691EU) and S.N. 98402455.4, filed in Europe on Oct. 6, 1998 (TI-28433EU).

FIELD OF THE INVENTION

The present invention relates to circular buffers, the management of circular buffers and processing engines providing circular buffer management.

BACKGROUND OF THE INVENTION

Circular addressing of memory can be useful in processor design for implementing many different types of processes, such as processes involving, for example, Viterbi, back-tracking, de-interleaving and vocoder computations.

It has been proposed to implement circular buffers in random access memory, where a circular buffer is defined with a defined buffer size (BK) aligned with predetermined memory boundaries. For example, it has been proposed to align circular buffers of a size R at memory boundary represented by the N lowest significant bits of the address being 0. The circular buffer then starts at an index of 0 with respect to the boundary where N is the smallest value such that $2^N > R$. For example the circular buffers could be aligned on 64 word boundaries. A circular buffer manager controls access to the circular buffer(s) through the use of pointers to the physical memory space. The requirement to align the circular buffers on memory boundaries can mean that inefficient use of space is achieved. For example, if a 38 word buffer has to be aligned on 64 word boundaries and a plurality of circular buffers are held in memory, the memory rapidly becomes fragmented, 26 words being unused between adjacent circular buffers. Also, in order to provide efficient control of circular buffers under certain programming languages, it is not desirable to have any alignment constraint.

An aim of the invention, therefore, is to provide for circular buffer management without the disadvantages of the prior approach.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided data processing apparatus supporting circular buffers. The apparatus comprises address storage for holding a virtual buffer index, offset storage for holding an offset address and buffer size storage for holding a buffer size. Circular buffer management logic is configured to be operable to apply a modifier to a virtual buffer index held in the address storage to derive a modified virtual buffer index and to apply a buffer offset held in the offset storage to the modified virtual buffer index to derive a physical address for addressing a circular buffer.

By employing virtual addressing to a buffer index for a circular buffer management, it is possible to make efficient use of memory resources by allowing one of more circular buffers to be located contiguously with each other or other data in memory, avoiding fragmentation of the memory. The buffer index forms a pointer for the circular buffer. The modifier can be defined by a user, or could be generated automatically in response to parameters such as the buffer size.

The use of virtual addressing also allows compatibility with existing software designed for apparatus which aligns the circular buffers with memory boundaries. The virtual address modification is transparent to the pre-existing software.

The use of virtual addressing can also facilitate the implementation of circular buffers using programming languages, for example the "C" programming language, which do not support memory alignment constraints.

The buffer offset can define a buffer start address, which can be held in an offset register. This can then be added to the modified virtual buffer index to derive a physical circular buffer address. The original and modified virtual buffer addresses can be held in an address register.

The address storage can be formed by a predetermined number of lower significant bits of an address register. The modified virtual buffer index can also be held in the predetermined number of lower significant bits of the address register. Higher order bits in the address register (typically the remainder of the address register) can define a buffer start address, whereby the combination of the higher and lower order bits in the address register defines a physical address.

The buffer offset, which can be held in an offset register, can be added to the physical address in the address register to define a physical address for addressing the circular buffer.

The apparatus can include random access memory for holding the circular buffer.

As an alternative to implementing a circular buffer in memory, an embodiment of the invention can provide manipulation of a bit array, which may be held in memory or in one or more processor registers.

A pointer configuration register can be provided for selectively setting a circular buffer mode for an address register. An exception mode qualifier can be provided for dynamically overriding the setting of a circular buffer mode. The qualifier can also be used dynamically to define whether the address storage is operable in a circular or a linear addressing mode.

In a circular buffer address computation mechanism, carry signals from first and second addition/subtraction computations are used in the computation of a sign value to determine the selection of the result of one of the addition/subtraction operations for the computation of a circular buffer address. The use of the carry signals in this manner can avoid the need for an initial masking step, with a consequent improvement in the speed path of the apparatus.

The apparatus can be in the form of digital signal processing apparatus, providing a digital signal processor (DSP), and can be implemented in one or more integrated circuits. The random access memory can be internal or external to the integrated circuit(s).

An embodiment of the invention finds application to telecommunications apparatus, where circular buffer functions find particular utility for processes involving, for example, Viterbi, back-tracking, de-interleaving and vocoder computations.

In accordance with another aspect of the invention, there is provided a method for managing circular buffer addressing in a data processing apparatus. The method comprises deriving a virtual buffer index;

modifying the virtual buffer index to derive a modified virtual buffer index;

adding a buffer offset to the modified virtual buffer index derive a circular buffer address.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which.

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
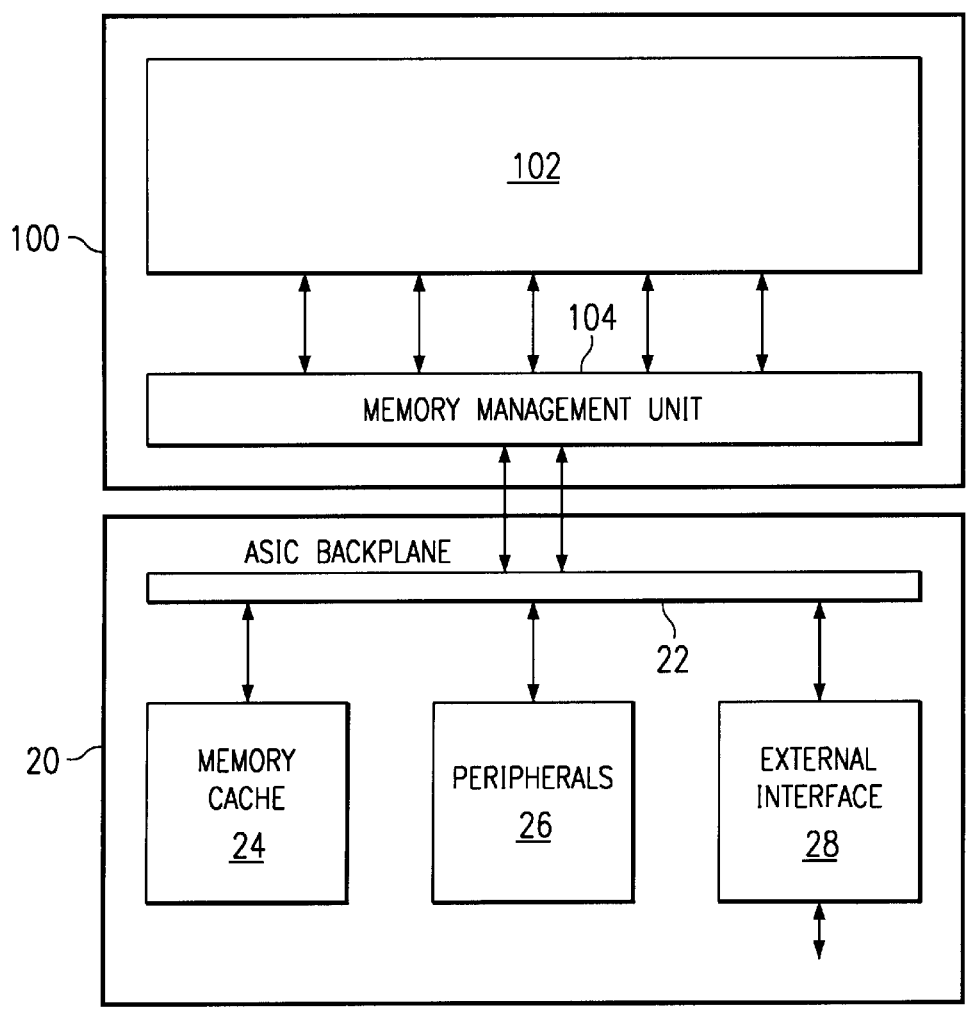
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
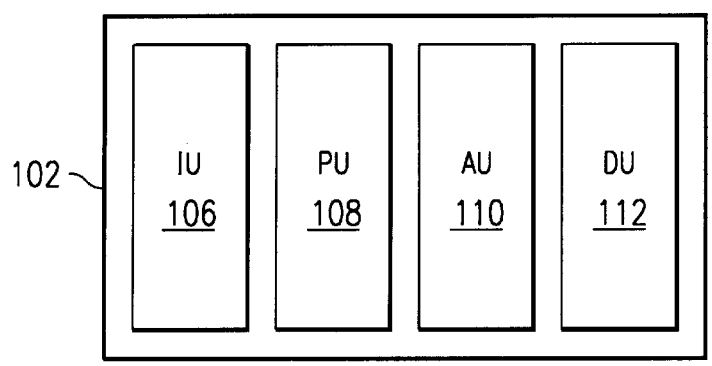
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
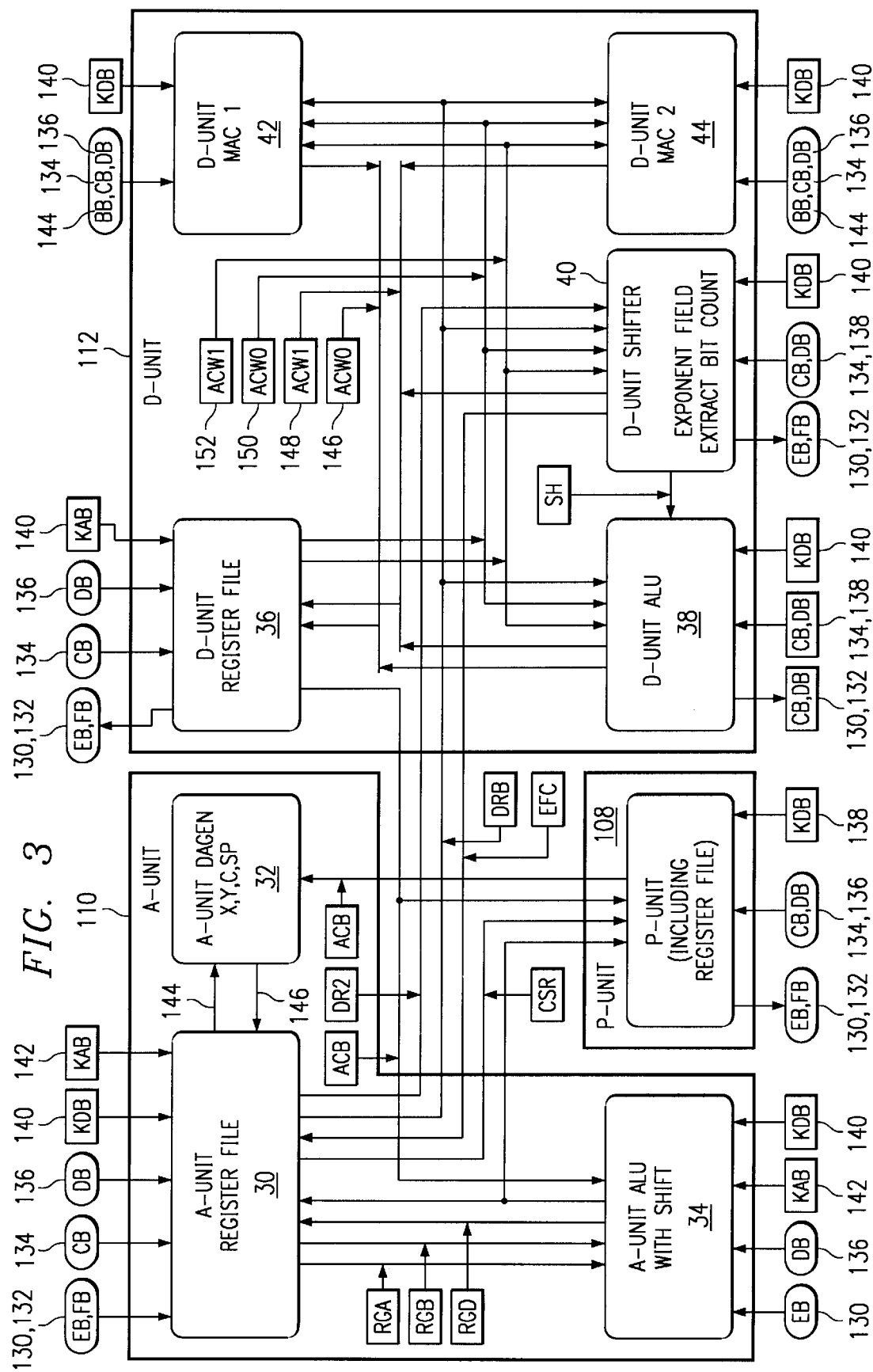
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
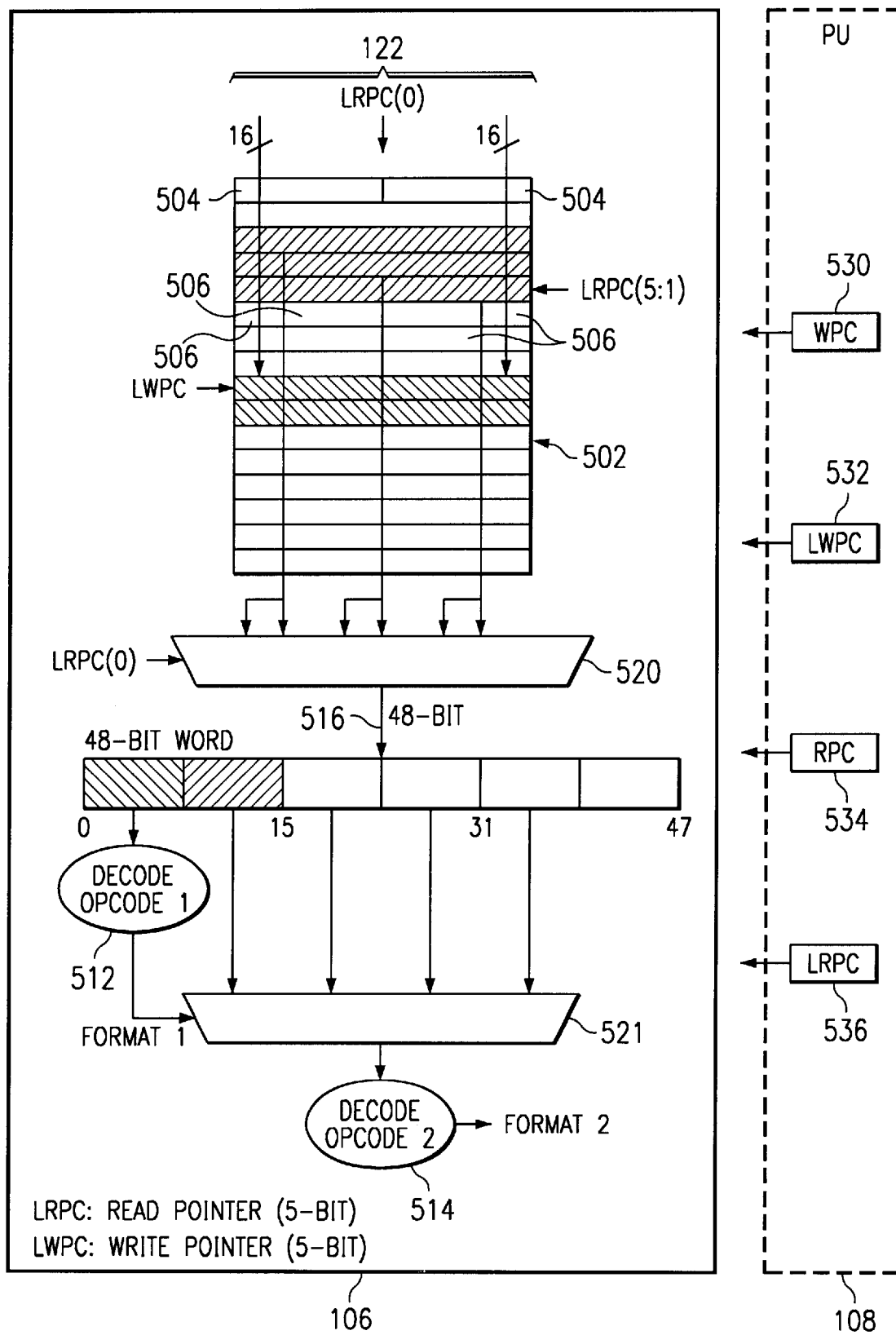
FIG. 4 is schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 5:
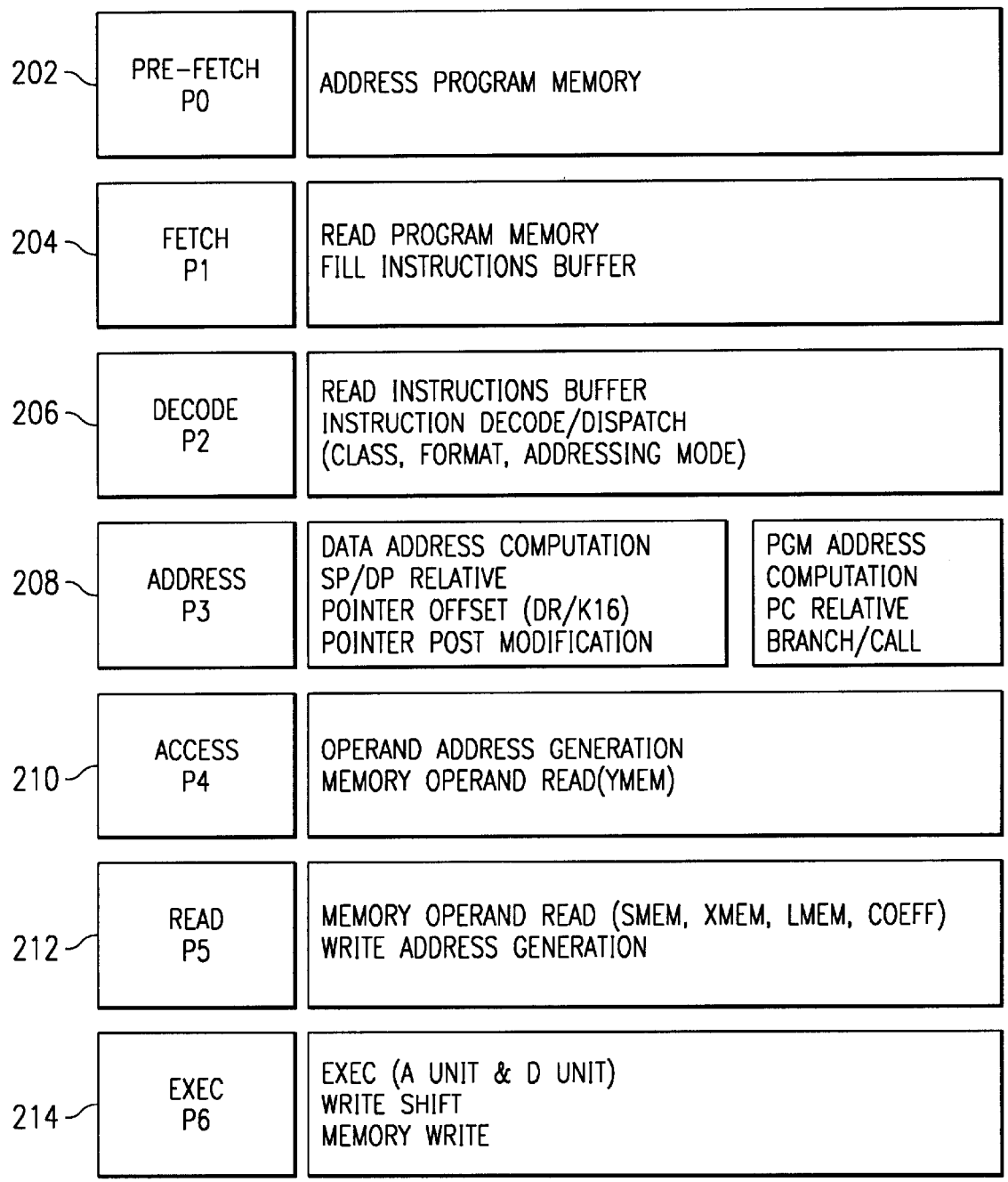
FIG. 5 is a representation of pipeline phases of the processor of FIG. 1.

The processor core 102 executes instructions through a seven stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 6:
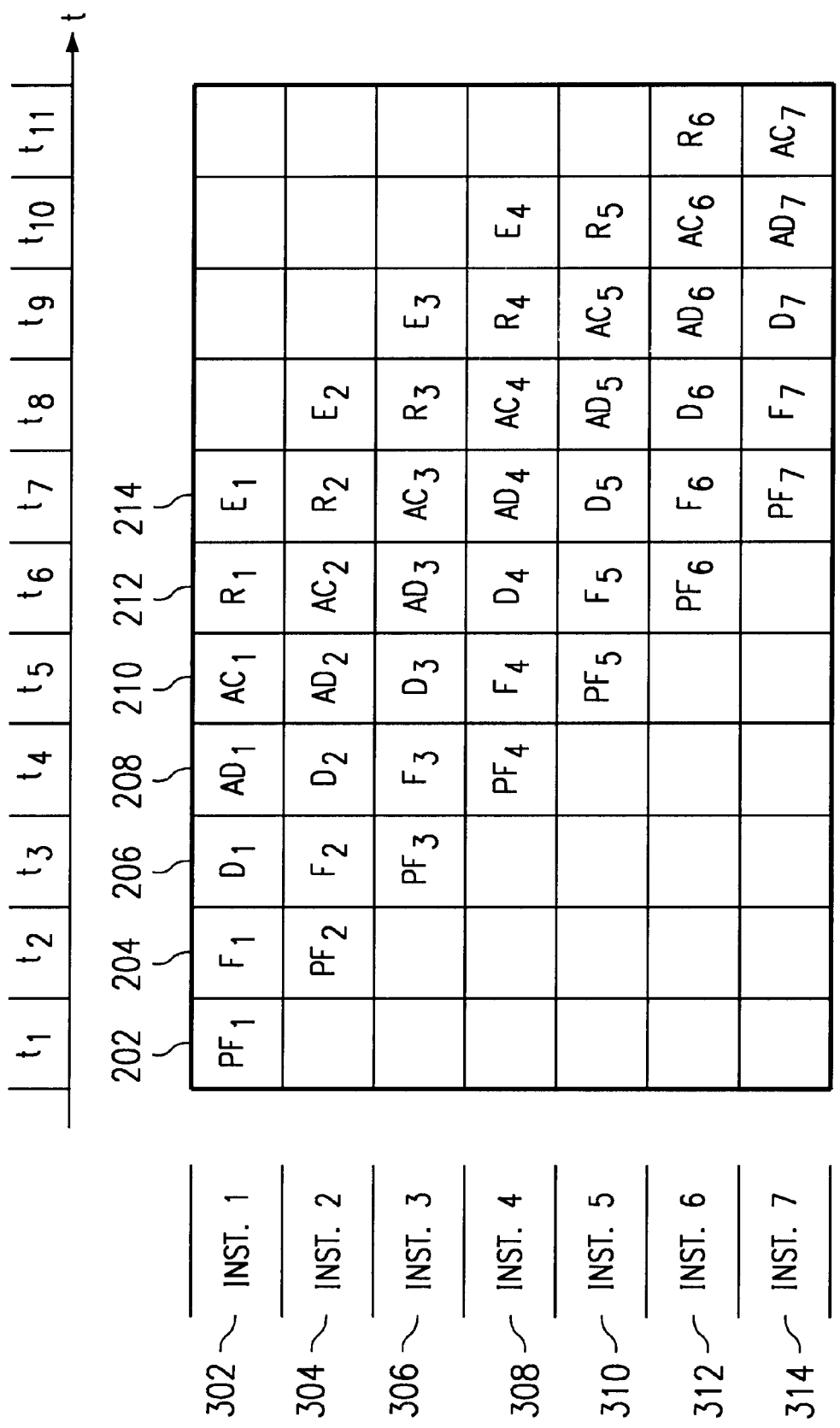
FIG. 6 is a diagrammatic illustration of an example of operation of a pipeline in the processor of FIG. 1.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of seven instructions may be processed simultaneously. For all seven instructions 302–314, FIG. 6 shows them all under process in time period $T_7$. Such a structure adds a form of parallelism to the processing of instructions.

Figure 7:
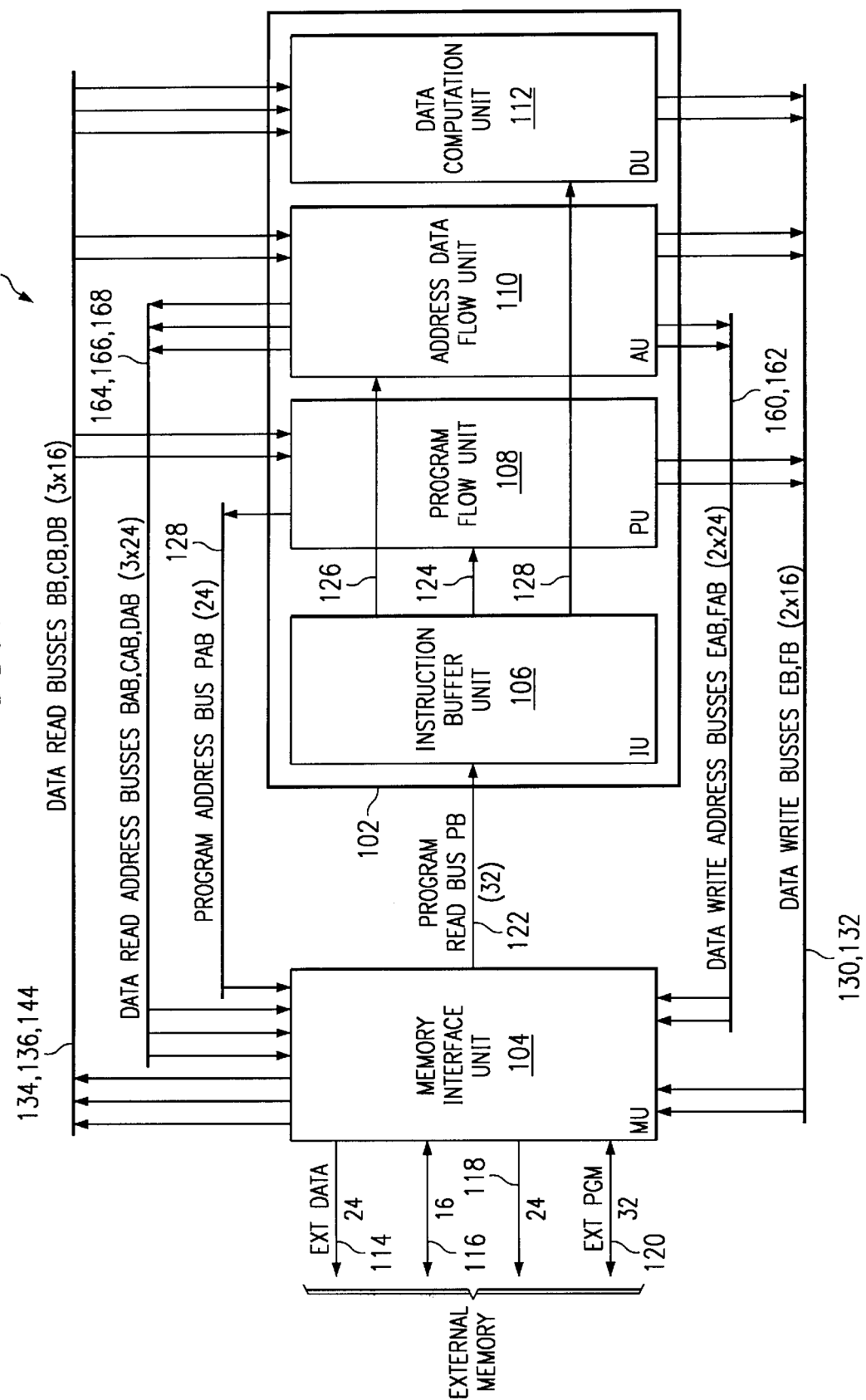
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bi-directional 16 bit data bus 116. Additionally, the memory management unit 104 is coupled to program storage memory (not shown) via a 24 bit address bus 118 and a 32 bit bidirectional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

In a particular embodiment of the invention, the processing engine 100 is responsive to machine instructions in a number of formats. Examples of such instructions in different formats are illustrated in the following.

8 Bit Instruction: OOOO OOOO

This represents an eight bit instruction, for example a memory map qualifier (MMAP( )) or a read port qualifier (readport( )). Such a qualifier comprises merely an eight bit opcode (OOOO OOOO). In such a case parallelism is implicit.

16 Bit Instruction: OOOO OOOE FSSS FDDD

This represents an example of a sixteen bit instruction, for example an instruction where the content of a destination register (e.g., dst) becomes the sum of the prior content of that register (dst) and the content of a source register (src), that is:

$$dst=dst+src$$

Such an instruction comprises a seven bit opcode (OOOO OOO) with a one bit parallel enable field (E), a four bit source register identifier (FSSS) and a four bit destination register identifier (FDDD).

16 Bit Instruction: OOOO FDDD PPPM MMMI

This represents another example of a sixteen bit instruction, for example where the content of a destination register (e.g., dst) becomes the content of a memory location (Smem), that is:

$$dst=Smem$$

Such an instruction comprises a four bit opcode (OOOO), a four bit destination register identifier (FDDD), a three bit pointer address (PPP), a four bit address modifier (M MMM) and a direct/indirect address indicator (I).

24 Bit Instruction: OOOO OOOE LLLL LLLL oCCC CCCC

This represents an example of a twenty four bit instruction, for example a conditional instruction for a branch to and offset (L8) where a condition is met, that is:

$$iF(cond)\ goto\ L8$$

Such an instruction comprises a seven bit opeode (OOOO OOO) with a one bit parallel enable field (E), an eight bit branch offset (LLLL LLLL), a one bit opcode extension (o) and a seven bit condition field (CCC CCCC).

24 Bit Instruction: OOOO OOOO PPPM MMMI SSDD ooU%

This is another example of a twenty-four bit instruction, for example a single memory operand instruction where the content of an accumulator ($AC_y$) becomes the result of rounding the sum of the content of another accumulator ($AC_x$) and the square of the content of a memory location (with optional rounding), and optionally the content of a data register (DR3) can become the content of the memory location, that is:

$$AC_y=rnd(AC_x+(Smem*Smem))\ [,\ DR3=Smem]$$

Such an instruction comprises an eight bit opcode (OOOO OOOO), a three bit pointer address (PPP), a four bit address modifier (M MMM), a one bit direct/indirect address indicator field (I), a two bit source accumulator identifier (SS), a two bit destination accumulator identifier (DD), a two bit opcode extension (oo), an update condition field (u), and a one bit rounding option field (%).

32 Bit Instruction: OOOO OOOO PPPM MMMI KKKK KKKK KKKK KKKK

This is an example of a thirty-two bit instruction, for example an instruction where the content of a test register (TC1) is set to 1 or 0 depending on the sign comparison of a memory location (Smem) to a constant value (K16), that is:

TC1=(Smem==K16)

Such an instruction comprises an eight bit opcode (OOOO OOOO), a three bit pointer address (PPP), a four bit address modifier (M MMM), a one bit direct/indirect address indicator field (I) and a sixteen bit constant field (KKKK KKKK KKKK KKKK).

In the following, particular reference is now made to circular buffer management. Circular buffers find application to, for example, Viterbi, back-tracking, de-interleaving and vocoder computations. Such computations are needed, for example, in telecommunications systems.

Figure 8:
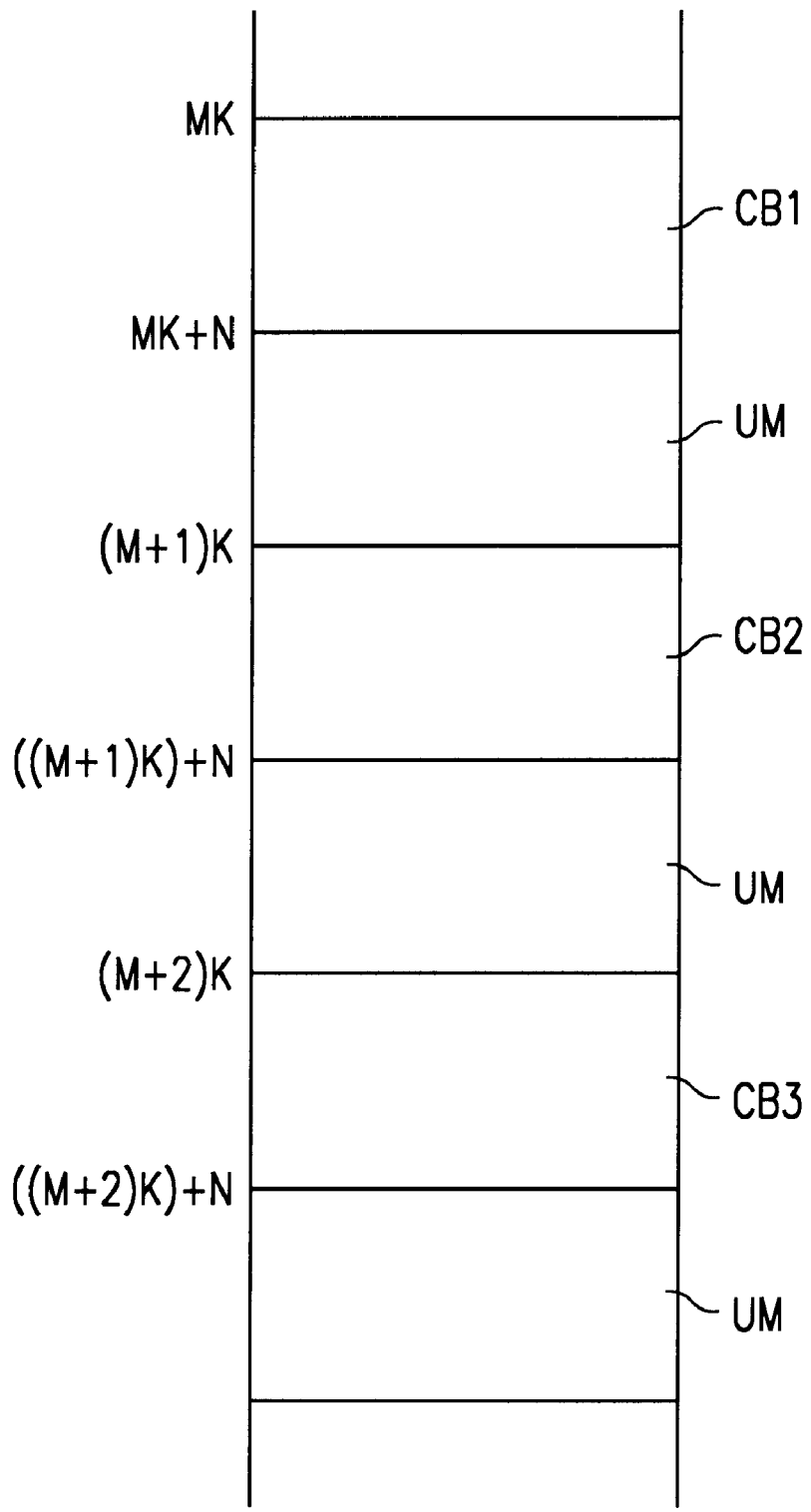
FIG. 8 illustrates circular buffer memory alignment in accordance with the prior art.

Circular buffers have been implemented in prior systems with the buffers being aligned on fixed memory boundaries. For example, it has been proposed to align circular buffers of a size R at memory boundary represented by the N lowest significant bits of the address being 0. The circular buffer then starts at an index of 0 with respect to the boundary where N is the smallest value such that $2^N > R$. For example the circular buffers could be aligned on 64 word boundaries. As a result, the system memory can rapidly become fragmented and/or be inefficiently used due to the circular buffers not fully occupying memory space. FIG. 8 illustrates this where first, second and third circular buffers CB1, CB2 and CB3 each comprising N words are arranged on K-word memory boundaries, where K>N. It can readily be seen that unused memory UM is left between the circular buffers. The present invention seeks to provide a solution to this inefficient use of memory.

Figure 9:
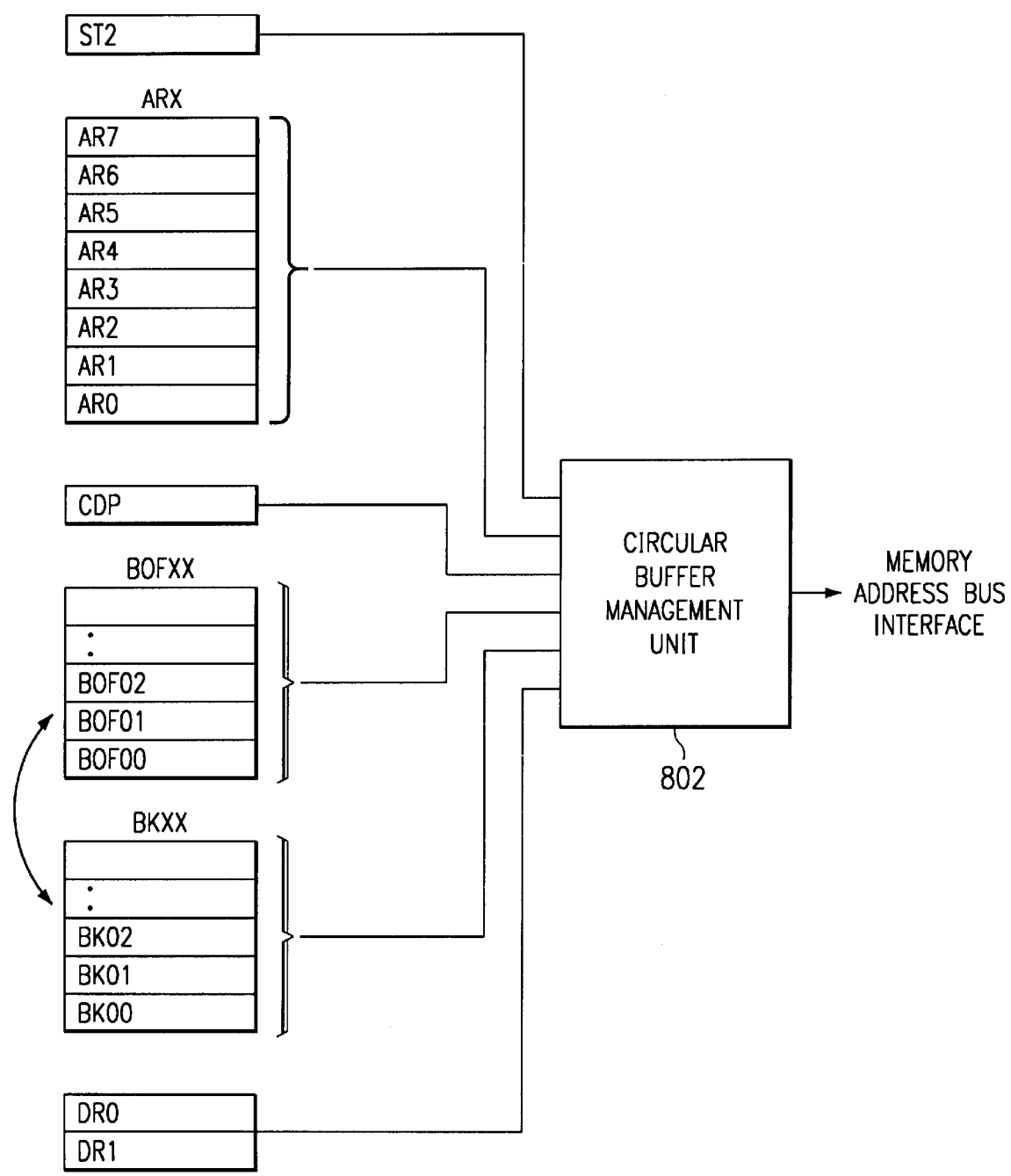
FIG. 9 illustrates aspects of a processor relating to circular buffer management according to an embodiment of the invention.

FIG. 9 is a schematic block diagram of aspects of the processor of FIG. 1 relevant to the understanding of the present invention. It will be appreciated that aspects of the processor of FIG. 1 not relevant to an understanding of the present invention, and which could be implemented in a conventional manner as will be understood by one skilled in the art, are not shown in FIG. 9 for reasons of clarity.

In an embodiment of the present invention, the circular buffers do not need to be aligned with any particular fixed memory boundaries, but can be located at an offset from the memory boundaries. This can be achieved in an embodiment of the invention while still maintaining compatibility with prior devices which require circular buffers to be located at fixed memory boundaries. This means that the circular buffer management should be transparent to prior software applications. Accordingly, hardware support for the circular buffer re-alignment is provided.

FIG. 9 shows a circular buffer management unit 802, which can form part of the DAGEN unit referred to earlier. Also shown are various registers used in circular buffer management. These include a pointer configuration register (ST2), address registers ARx (AR0–AR7), a coefficient data pointer (CDP), index/offset registers DR0 and DR1, buffer offset registers BOFxx and buffer size registers BKxx. The circular buffer management unit 802 is responsive to values stored in the various registers to manage the addressing of the circular buffers. Although the various data items utilized by the circular buffer management unit are stored in registers in the present example, it will be appreciated that at least some and possibly all of these data items could be held in registers configured in random access memory.

The pointer configuration register ST2 comprises qualifiers for representing whether an associated address register is operable in a circular addressing mode or a linear addressing mode. The provision of the register avoids the need to specify for each instruction whether a circular buffer or a linear operation is currently being employed. The appropriate bit in the pointer configuration register ST2 can be set when a circular addressing mode is entered and can be reset when the circular addressing mode is terminated. However, exceptions may be provided for ignoring the state of the pointer configuration register in order to avoid the need to redefine the qualification for the pointer configuration register ST2 for a linear buffer where this has already been set for a circular buffer. Thus, an exception mode qualifier can be provided for dynamically overriding the setting of a circular buffer mode. The qualifier can also be used dynamically to define whether the address storage is operable in a circular or a linear addressing mode.

A "Linear/Circular Addressing" instruction qualifier is provide. It can be paralleled with any instruction making an indirect Smem, Xmem, Ymem, Lmem, Baddr, coeff addressing. It cannot be executed in parallel with other type of instructions. It cannot be executed alone. The syntax is as follows:

01—linear( )

02—circular( ).

When instruction 01 is used in parallel with another such instruction, all modification of ARx and CDP pointer registers used in the indirect addressing mode are done linearly, as if ST2 register bit 0 to 8 were cleared to 0.

When instruction 02 is used in parallel with another such instruction, all modification of ARx and CDP pointer registers used in the indirect addressing mode are done circularly, as if ST2 register bit 0 to 8 were set to 1.

The index/offset registers DR0 and DR1 provide indexes to the eight address registers ARx. This compares to a prior processing engine where only one address register (AR0) was provided. Indexes can also be provided in the form of a user defined constant, or in the form of a ±1 for a single word access or a ±2 for a double word access.

The buffer offset registers act as qualifiers for the address registers, so that the address registers can still be accessed by prior software without knowledge of the offset provided in an embodiment of the invention. As can be seen from Table 1 below, the buffer offset registers BOFxx and the buffer size registers BKx are shared between address registers. For example, as shown, in Table 1, buffer offset register BOF0 is shared between address registers AR0 and AR1, BOF23 is shared between address registers AR2 and AR3, and so on. Buffer size registers define a size of the circular buffer. As can also be seen in Table 1, the buffer size registers are shared. For example, as shown, buffer size register BK03 is shared between address registers AR0, AR1, AR2 and AR3.

TABLE 1

| Pointer Register | Circular Linear Configuration bit | Data Page Pointer Register (for data memory addressing only) | Buffer Offset Register | Buffer Size |
|---|---|---|---|---|
| AR0 | ST2[0] | MDP05 | BOF01[15:0] | BK03 |
| AR1 | ST2[1] | MDP05 | BOF01[15:0] | |
| AR2 | ST2[2] | MDP05 | BOF23[15:0] | |
| AR3 | ST2[3] | MDP05 | BOF23[15:0] | |
| AR4 | ST2[4] | MDP05 | BOF45[15:0] | BK47 |
| AR5 | ST2[5] | MDP05 | BOF45[15:0] | |
| AR6 | ST2[6] | MDP67 | BOF67[15:0] | |

TABLE 1-continued

| Pointer Register | Circular Linear Configuration bit | Data Page Pointer Register (for data memory addressing only) | Buffer Offset Register | Buffer Size |
|---|---|---|---|---|
| AR7 | SR2[7] | MDP67 | BOF67[15:0] | |
| CDP | ST2[8] | MDP | BOFC[15:0] | BKC |

A circular buffer size is defined by a buffer size register associated with an address register pointer. Three buffer sizes are supported in the example described (although other buffer sizes could be supported in other examples). Thus, buffer size registers can provide a circular addressing parameter of a first group of address registers, a second group of address registers and a coefficient data pointer register, respectively. Two consecutive address registers can share the same buffer offset register. However each pointer has its own circular/linear configuration bit in the pointer configuration register (ST2). Circular addressing is performed only if the associated ST2 configuration bit is set or if the memory instruction is executed in parallel with a circular byte qualifier.

Two basic modes of operation are envisaged.

In a first mode the address register points to a virtual buffer with the start address matching a K-bit boundary. A virtual buffer start address is defined by the ARx high field (the field width defined by the buffer size) and the ARx low field cleared. An address computation is performed on the virtual address according to a modifier. Virtual to physical address translation is performed by adding the buffer address offset stored in the associated buffer offset register BOFxx to the virtual address. The offset is only added if circular modification has been selected.

In a second mode, the buffer start address is stored in a BOFxx register. The index is stored in an ARx register and computed according to the modifier. Virtual to physical address translation is performed by adding the index to the buffer start address stored into the associated BOFxx register. The buffer start address is only added if circular modification has been selected.

Figure 10:
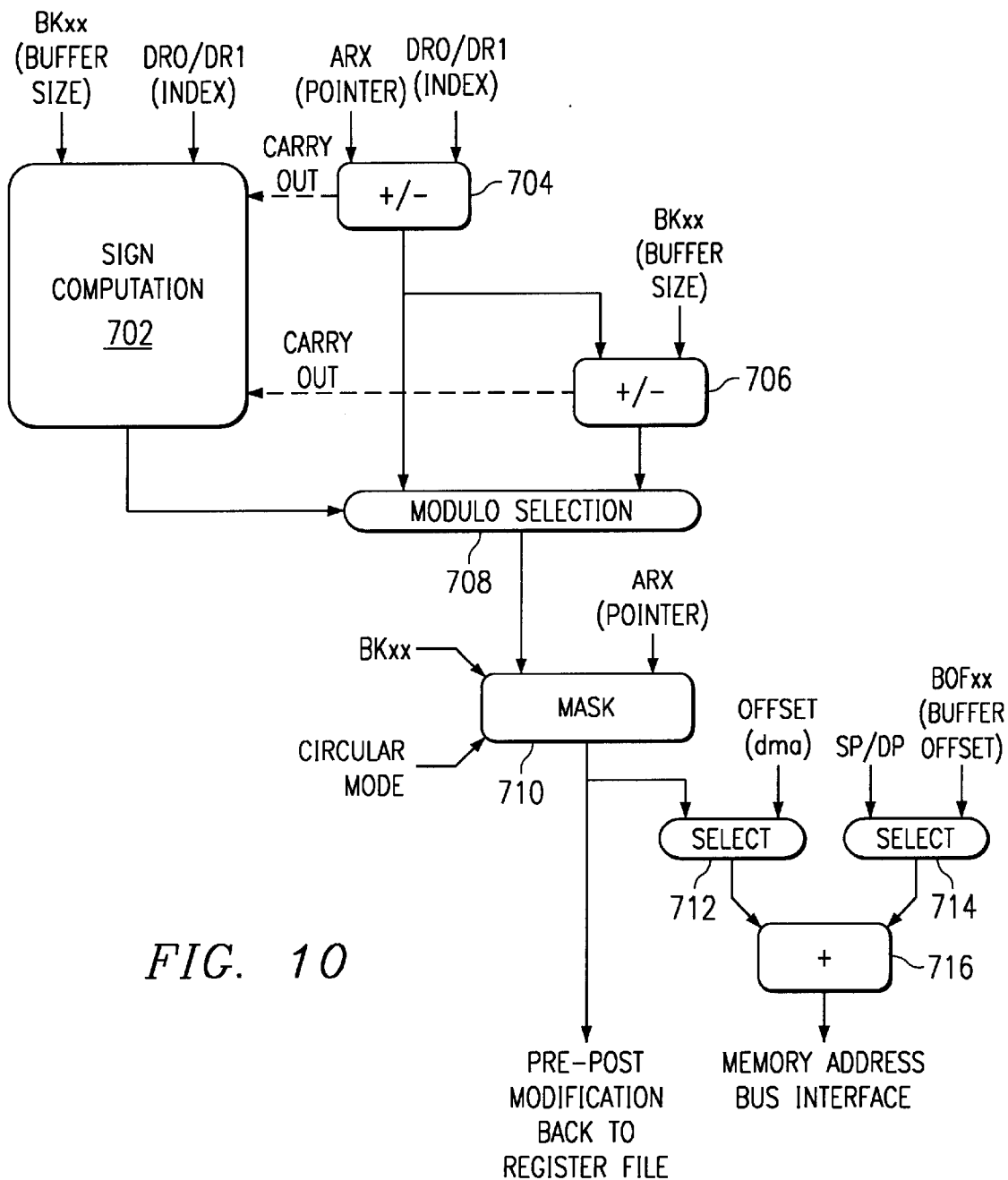
FIG. 10 illustrates circular buffer addressing according to an embodiment of the invention.

FIG. 10 is a schematic representation of circular buffer address generation. This is performed in the A Unit DAGEN 32. Here, a signed computation 702 is performed on the basis of the buffer size from a BKxx register and an index value from, for example, the DR0/DR1 registers. All carry outputs from first and second addition/subtraction operations 704 and 706 are supplied to the sign computation 702. This enables the sign computation to determine whether to take the output from the first or second addition/subtraction operations 704 and 706 as described below. The use of the carry outputs enables an initial masking step (which would otherwise be needed prior to the stages shown in FIG. 10) to be dispensed with.

The first addition/subtraction operation 704 is performed on the basis of a pointer from an ARx register and an index value from, for example, the DR0/DR1 registers. The second addition/subtraction operation 706 is performed on the basis of the output of the first increment/decrement operation 704 and the buffer size from a BKxx register. The output of the sign computation 702 is used to control a modulo-selection of the outputs of the first and second addition/subtraction operations 704 and 706. Thus, the carry signals from first and second addition/subtraction computations are used in the computation of sign value to determine the selection of the result of one of the addition/subtraction operations for computation of a circular buffer address.

A masking operation 710 is then formed on the basis of the output from the modulo-selection 708 and a pointer from the ARx register under the control of the signed computation 702. A pre-post modification from the mask operation is returned to a register file. The output of the mask operation is also used by a select operation 712 where a selection is made from a direct memory access offset (dma) value. A selection is also performed 714 between a stack pointer/data page pointer (SP/DP) value and a buffer offset from a BOFxx register. The output of the select operation 712 and 714 is ANDed at 716 to provide signals to a memory address bus interface.

Circular addressing can be used for indirect single data memory access (Smem, dbl(Lmem)), indirect register bit access (Baddr), or indirect dual data memory access (Xmem, Ymem), including software indirect dual data memory accesses and coefficient data memory addressing (coeff).

The ARx address register and CDP address registers are used as pointers within a circular buffer. The circular memory buffer start address is not bounded to any alignment constraints. Compatibility with prior circular buffer management mechanisms with alignment constraints is assured, as will now be described with reference to FIG. 11.

Figure 11:
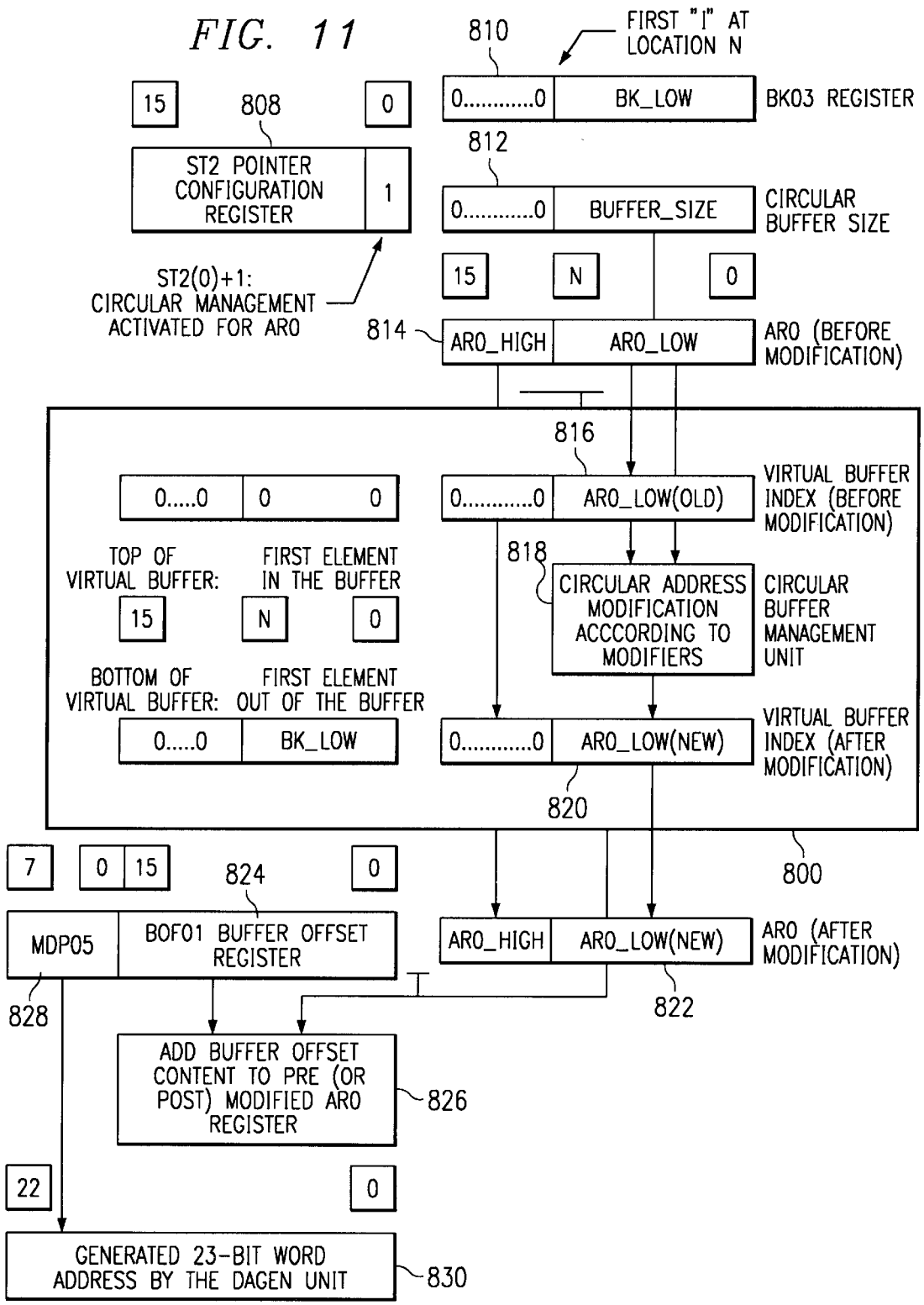
FIG. 11 illustrates an example of circular buffer memory alignment in accordance with an embodiment of the invention.

In the example of FIG. 11, an address register AR0 and an offset register BOF01 are used to address a circular buffer. A further register BK03 is used to hold the size of the buffer. A bit in a pointer configuration register ST2 is set to 1 in order to set a circular addressing modification mode for the address register AR0.

The DAGEN unit uses a main data page pointer register to build a 23-bit word address pointer for data memory addressing. Concatenation with main data page pointers does not occur in case of register bit addressing.

Each of eight Address registers ARx and the coefficient data pointer CDP can be independently configured to be linearly or circularly modified through indirect addressing performed with these pointer registers. This configuration is achieved by the setting of the ST2 status bit register. Table 1 illustrates the various states of the ST2, BOFxx and BKxx registers for configuring circular modification of ARx and CDP registers.

As mentioned above, the circular buffer size is defined by the buffer size registers. Three 16-bit buffer size registers (BK03, BK47 and BKC) are supported in the example shown in Table 1. The circular buffer start address is defined by the buffer offset register combined with the corresponding ARx address register or CDP coefficient data pointer register. Five 16-bit buffer offset registers (BOF01, BOF23, BOF45, BOF67 and BOFC) are supported in the example shown in Table 1. Table 1 also shows which buffer offset register is used when circular addressing is performed.

By the provision of the three buffer size registers BKx shown in Table 1, and three address generators, three operand instructions can be supported.

The addressing applied by the logic of the circular buffer addressing unit will now be explained with reference to FIG. 11.

The address boundaries of a virtual buffer are defined by a buffer size value in the buffer size register BKxx 810 (In FIG. 11, register BK03). The circular buffer management unit maintains a buffer index within the virtual buffer address boundaries represented by the buffer size value 812.

The top of the virtual buffer address is address 0H and the bottom of the virtual buffer address is defined by the content of the buffer size register BKxx 810. The location of the first '1' in the BKxx register (say bit N) allows the building of an virtual buffer index within the virtual buffer from the ARx register (in FIG. 11 register AR0). The virtual buffer index is then defined by lowest bits of the ARx register up to bit N, with the remaining higher order bits taken as being zero (i.e. with bits N+1 to 15 being taken as being zero), as represented at 816 in FIG. 11.

The circular buffer management unit 800 performs arithmetic operations 818 on this index, whereby an addition or a subtraction of the BKxx register content is performed according to the value of the virtual buffer index versus the top and bottom of this virtual buffer to form a modified (or new) virtual buffer index 820.

The modified (or new) ARx 820 register value is then built from the modified virtual buffer index 820 and the high (15-N) bits of the old content of the ARx register 814.

According to the selected indirect addressing mode, the address 830 output by the DAGEN is then a 23-bit word address resulting from either:

the 16-bit addition 826 of BOFxx register 824 and the new content of the ARx register 822 for addressing modes requiring, pre-modification of pointer registers; or the 16-bit addition of BOFxx resister 824 and the old content of the ARx register 814 for addressing modes requiring, post-modification of pointer resisters;

in each case followed by a concatenation of the corresponding 7-bit main data page pointer register MDPxx 828 (in FIG. 11, MDP05). It should be noted that this concatenation does not occur when register bit addressing is performed.

The circular addressing performed by the circular buffer management unit is further represented in the algorithm set out in Table 2, taking into account that a pre-modification of a pointer register may modify the ARx register by a step value (e.g. *+ARx(#K16) addressing mode).

TABLE 2

| if(step >= 0) | if((index + step − BKxx) >= 0) | /* out of buffer */ |
| | new index = index + step − BKxx; | |
| | else | /* in buffer */ |
| | new index = index + step; | |
| if(step < 0) | if((index + step) >= 0) | /* in buffer */ |
| | new index = index + step; | |
| | else | /* out of buffer */ |
| | new index = index + step + BKxx; | |

Figure 12:
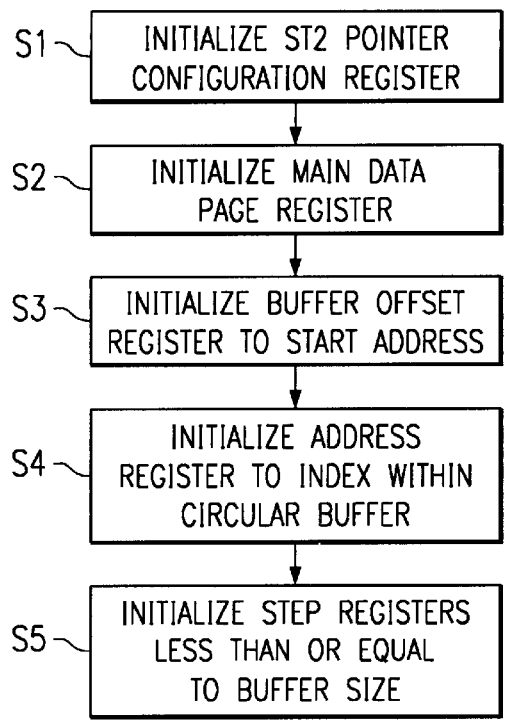
FIG. 12 is a flow diagram illustrating steps in circular buffer management according to an embodiment of the invention.

The implementation of the circular buffer management is further illustrated in the flow diagram in FIG. 12.

In step S1, an appropriate bit of the ST2 pointer configuration register is initialized to set circular activity for the selected pointer.

In step S2 the appropriate MDPxx main data page pointer is initialized to select a 64K page where the circular buffer is implemented.

In step S3, the appropriate BOFxx buffer offset register is initialized to the start address of the circular buffer.

In step S4, the appropriate ARx register is initialized as the index within the circular buffer.

It should be noted that the initialization of the MDPxx, BOFxx and ARx registers is done in such manner that before any pointer modification occurs on the selected pointer register, the 23-bit address MDPxx & (BOFx+ARx) points within the circular buffer.

In step S5, DR0 and DR1 step registers are initialized in such way that they are lower than or equal to the buffer size BKxx.

An example of a code sequence for achieving this is illustrated in Table 3.

TABLE 3

| bit(ST2, #0) = #1 | ;AR0 is configured as circular buffer pointer |
| MDP05 = #01h | ;circular buffer is implemented in main data page 1 |
| BOF01 = #0A02h | ;circular buffer start address is 010A02h |
| BK03 = #6 | ;circular buffer size is 6 words |
| DR0 = #2 | ;index step is 2 words |
| AR0 = #3 | ;buffer index initialized to 3 |
| AC0 = *(AR0 + DR0) | ;AC0 loaded from 010A05h, AR0 = 5 |
| AC0 = *(AR0 + DR0) | ;AC0 loaded from 010A07h, AR0 = 1 |
| AC0 = *(AR0 + DR0) | ;AC0 loaded from 010A03h, AR0 = 3 |

Figure 13:
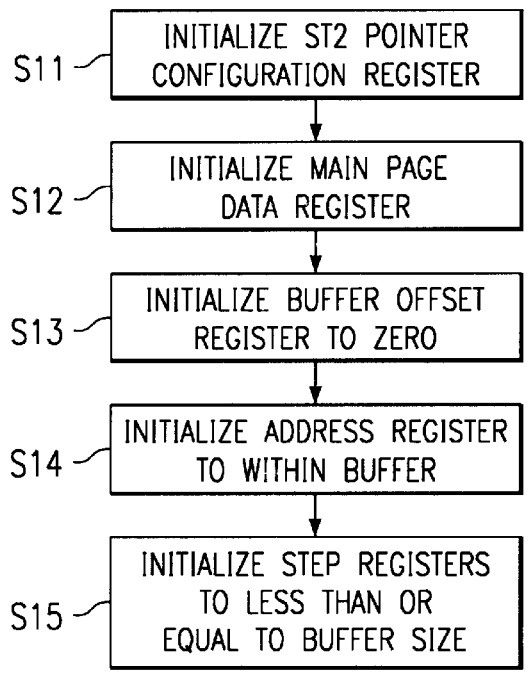
FIG. 13 is a further flow diagram illustrating steps in circular buffer management according to an embodiment of the invention.

In an alternative mode to provide compatibility with addressing based on memory boundaries, with a status bit set to 1, the circular buffer size resister BK03 is associated to bits AR[0–7] and the BK47 register access is disabled. In this case, the steps are indicated in FIG. 13.

In step S11, an appropriate bit of the ST2 pointer configuration register is initialized to set circular activity for the selected pointer.

In step S12 the appropriate MDPxx main data page pointer is initialized to select a 64K page where the circular buffer is implemented. An address translator output code assumes the main data page is 0.

In step S13, the appropriate BOFxx buffer offset register is initialized to a value (e.g., 0, or a value supplied by a user). The address translator output code assumes that all BOFxx registers are set to 0.

In step S14, the appropriate ARx register is initialized before using any circular addressing. The selected register should point within the circular buffer.

In step S15, the address register and the DR1 step register are initialized in such way that they are lower than or equal to the buffer size BKxx.

An example of a code sequence for achieving this is illustrated in Table 4.

TABLE 4

| bit(ST2, #0) = #1 | ;AR0 configured as circular buffer pointer |
| MDP05 = #0h | ;circular buffer is implemented in main data page 0 |
| BOF01 = #1h; | ;circular buffer offset is 5 words |
| BK03 = #6 | ;circular buffer size is 6 words |
| DR0 = #2 | ;index step is 2 words |
| AR0 = #0A03h | ;circular buffer virtual address is A00h |
| AC0 = *(AR0 + DR0) | ;AC0 loaded from 010A04h, AR0 = 0A05h |
| AC0 = *(AR0 + DR0) | ;AC0 loaded from 010A06h, AR0 = 0A01h |
| AC0 = *(AR0 + DR0) | ;AC0 loaded from 010A02h, AR0 = 0A03h |

It will be noted that the BOF01 register is initialized with an offset supplied by a user. This removes the alignment between the circular buffer and a memory boundary. Thus a flexible positioning of the circular buffer is possible.

In the above description, reference has been made to the addressing of words in memory to provide circular buffers, particularly in the context of avoiding the need to locate circular buffers at specific memory boundaries. However, the invention is not limited to the addressing of circular buffers in memory. An embodiment of the invention can also be employed to provide the addressing of bit arrays, whether in memory or in one or more processor registers. In this case the bit arrays are effectively managed as circular buffers. For example, a bit manipulation instruction can access an address register ARx which points to a bit in a register, and the address pointed to can be modified to step around the register every X bits.

The processor CPU core takes advantage of the Data Address Generation Unit (DAGEN) features to provide an efficient means to address a bit within a CPU register. In this case, no memory access is performed. Direct and indirect register bit addressing mode can be used in instructions performing bit manipulation on the processor core CPU address, data and accumulator registers. Register bit addressing will be designated in instructions with the 'Baddr' keyword. Five bit manipulation instructions, shown in the examples below, use this addressing mode. The last instruction example causes a single register bit address to be generated by the DAGEN unit while two consecutive bits are tested within the 'src' register:

TCx=bit(src, Baddr)
cbit(src, Baddr)
bit(src, Baddr)=#0
bit(src, Baddr)=#1
bit(src, pair(Baddr))

Direct bit addressing mode (dba) allows direct bit access to the processor CPU registers. The bit address is specified within:

[0.23] range when addressing a bit within the ARx address registers or the DRx data registers,

[0 . . . 393] range when addressing a bit within the ACx accumulator registers.

[0 . . . 22] range when addressing two consecutive bits within the ARx address registers or the DRx data registers,

[0 . . . 38] range when addressing two consecutive bits within the ACx accumulator registers.

Indirect register bit addressing mode computes a bit position within a CPU register from the contents of the eight address registers AR[0–7] or from the contents of the coefficient data pointer CDP. Whenever such CPU register bit access is performed, the selected pointer register can be modified before of after the bit position has been generated. Pre-modifiers will modify the content of the pointer register before generating the register bit position. Post-modifiers will modify the content of the pointer register after generating the register bit position. The sets of the modifiers applied to the pointer register depends on ARMS statuts bit. When ARMS=0, 'DSP mode' modifiers are used for indirect register bit accesses. When ARMS=1, 'Control mode' modifiers are used.

The modifiers applied to the selected pointer register can be controlled by a circular management mechanism in order to implement circular bit arrays in CPU registers. The circular management mechanism is controlled by following resources:

The status register ST2, where each pointer register can be configured in circular or in linear mode.

The three 16-bit buffer size registers BK03, BK47, and BKC where the size of the circular bit arrays to implement can be determined The five 16-bit buffer offset registers BOF01, BOF23, BOF45, BOF67 and BOFC allow implementation of circular bit arrays starting at any bit position in the CPU registers.

Figure 14:
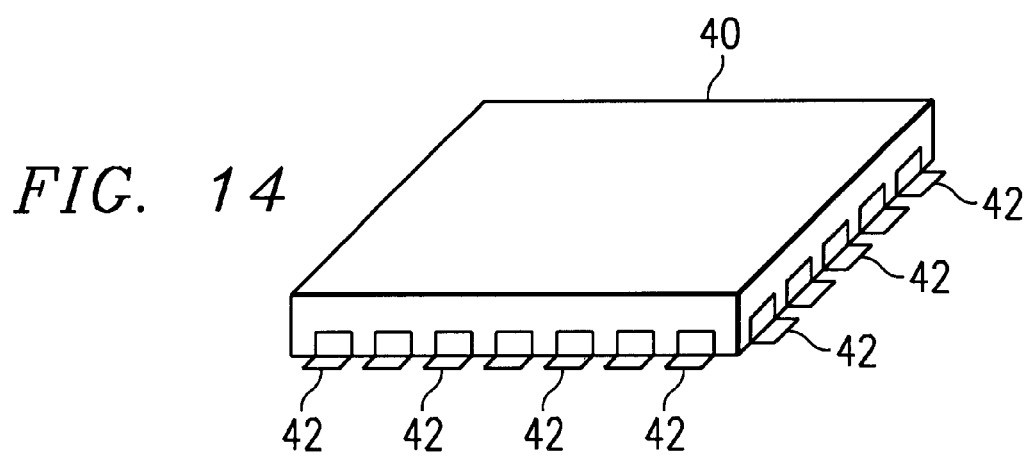
FIG. 14 is a schematic representation of an integrated circuit incorporating the processor of FIG. 1.

FIG. 14 is a schematic representation of an integrated circuit 40 incorporating the processor 10 of FIG. 1. The integrated circuit can be implemented using application specific integrated circuit (ASIC) technology. As shown, the integrated circuit includes a plurality of contacts 42 for surface mounting. However, the integrated circuit could include other configurations, As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

Figure 15:
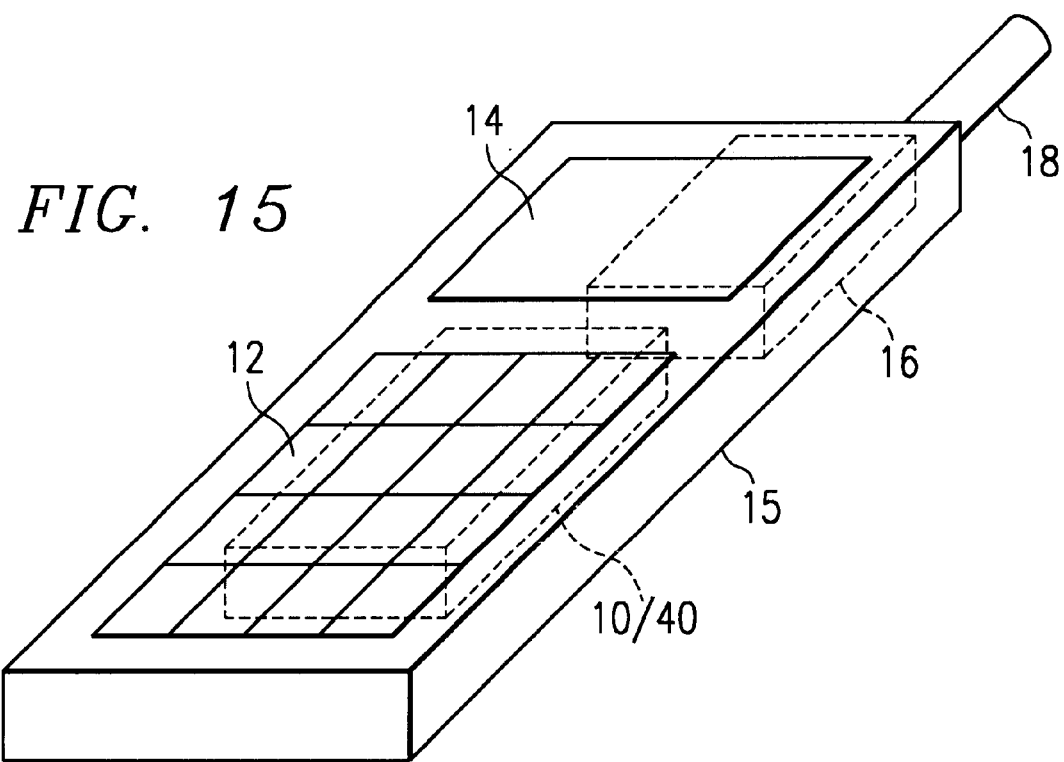
FIG. 15 is a schematic representation of a telecommunications device incorporating the processor of FIG. 1.

One application for a processing engine such as the processor 10, for example as incorporated in an integrated circuit as in FIG. 15, is in a telecommunications device 15, for example a mobile wireless telecommunications device. FIG. 15 illustrates one example of such a telecommunications device. In the specific example illustrated in FIG. 15, the telecommunications device is a mobile telephone 11 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Thus, there has been described data processing apparatus supporting circular buffers including address storage for holding a virtual buffer index and offset storage for holding an offset address. Circular buffer management logic is configured to be operable to apply a modifier to a virtual buffer index held in the address storage to derive a modified virtual buffer index and to apply a buffer offset held in the offset storage to the modified virtual buffer index to derive a physical address for addressing a circular buffer, which could be providing in memory or in one or more processor registers and could relate to a word address, a byte address or a bit address.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system with a data processing apparatus supporting circular buffers, the apparatus comprising:
    address storage for holding a virtual buffer index;
    offset storage for holding an offset address;
    circular buffer management logic configured to operate in a circular mode by applying a modifier to a virtual buffer index held in the address storage to derive a modified virtual buffer index and to apply a buffer offset held in the offset storage to the modified virtual buffer index to derive a physical address for addressing a circular buffer; and
    further comprising a pointer configuration register for selectively defining whether the address storage is operated on in a circular or a linear addressing mode.

2. The apparatus according to claim 1, wherein the address storage comprises a predetermined number of lower significant bits of an address register.

3. The apparatus according to claim 2, wherein the modified virtual buffer index is held in the predetermined number of lower significant bits of the address register.

4. The apparatus according to claim 3, wherein higher order bits in the address register define a buffer start address, whereby the combination of the higher and lower order bits in the address register defines a physical address.

5. The apparatus according to claim 4, wherein the buffer offset is held in an offset register, the buffer offset being added to the physical address in the address register to define a physical address for addressing the circular buffer.

6. The apparatus according to claim 5, further comprising a buffer size register for holding a buffer size value.

7. The digital system according to claim 6, further comprising random access memory connected to the apparatus for holding the circular buffer.

8. The digital system according to claim 7, wherein the circular buffer is a bit array.

9. The apparatus according to claim 1, wherein the apparatus executes an exception mode qualifier in conjunction with a memory reference instruction for dynamically defining whether the address storage is operated on in a circular or a linear addressing mode.

10. The apparatus according to claim 1, further comprising a circular buffer address computation mechanism, wherein carry signals from first and second addition/subtraction computations are used in the computation of a sign value to determine the selection of the result of one of the addition/subtraction operations for computation of a circular buffer address.

11. The digital system of claim 1 being a cellular telephone, further comprising:

an integrated keyboard connected to the data processing apparatus via a keyboard adapter;

a display, connected to the processor via a display adapter;

radio frequency (RF) circuitry connected to the processor; and an aerial connected to the RF circuitry.

12. A method for managing circular buffer addressing in a data processing apparatus, the method comprising the steps of:

setting a circular buffer mode for an address register by setting a qualifier in a pointer configuration register;

deriving a virtual buffer index in the address register;

modifying the virtual buffer index to derive a modified virtual buffer index responsive to the circular buffer mode; and adding a buffer offset to the modified virtual buffer index to derive a circular buffer address responsive to the circular buffer mode.

13. The method according to claim 12, wherein a circular buffer is a bit array.

14. The method according to claim 12 further comprising the step of selectively overriding the circular buffer mode for the address register.

15. The method according to claim 12, comprising dynamically defining whether the address register is operated on in a circular or a linear addressing mode.

16. The method according to claim 12, wherein carry signals from first and second addition/subtraction computations are used in the computation of a sign value to select the result of one of the addition/subtraction operations for computation of a circular buffer address.

* * * * *